United States Patent
Mao et al.

(10) Patent No.: US 6,934,131 B2
(45) Date of Patent: Aug. 23, 2005

(54) SPIN VALVE WITH THERMALLY STABLE PINNED LAYER STRUCTURE HAVING RUTHENIUM OXIDE SPECULAR REFLECTING LAYER

(75) Inventors: Ming Mao, Pleasanton, CA (US); Adrian J. Devasahayam, Woodmere, NY (US); Jacques C. S. Kools, Sunnyvale, CA (US); Chih-Ling Lee, Rochester, NY (US); Chih-Ching Hu, Rochester, NY (US); Patricia L. Cox, Rochester, NY (US)

(73) Assignee: Veeco Instruments, Inc., Woodbury, NY (US)

( * ) Notice: Subject to any disclaimer, the term of this patent is extended or adjusted under 35 U.S.C. 154(b) by 118 days.

(21) Appl. No.: 10/341,281

(22) Filed: Jan. 13, 2003

(65) Prior Publication Data

US 2004/0136121 A1 Jul. 15, 2004

(51) Int. Cl.$^7$ ................................................ G11B 5/39
(52) U.S. Cl. ................................................ 360/324.11
(58) Field of Search ..................................... 360/324.11

(56) References Cited

U.S. PATENT DOCUMENTS

| | | | |
|---|---|---|---|
| 6,407,890 B1 | 6/2002 | Gill | 360/314 |
| 6,452,763 B1 * | 9/2002 | Gill | 360/324.11 |
| 6,473,278 B1 | 10/2002 | Gill | 360/324.12 |
| 6,482,657 B2 | 11/2002 | Shimazawa | 438/3 |
| 6,496,337 B1 | 12/2002 | Wang et al. | 360/324.12 |
| 6,498,107 B1 | 12/2002 | Fenner | 438/706 |
| 6,580,589 B1 * | 6/2003 | Gill | 360/324.11 |
| 2002/0012812 A1 | 1/2002 | Hasegawa et al. | 428/692 |
| 2002/0041473 A1 | 4/2002 | Hoshiya et al. | 360/324.11 |
| 2002/0085322 A1 | 7/2002 | Pinarbasi | 360/324.12 |
| 2002/0126426 A1 | 9/2002 | Gill | 360/324.12 |
| 2002/0126428 A1 | 9/2002 | Gill | 360/324.12 |
| 2002/0159205 A1 | 10/2002 | Kula et al. | 360/324.11 |
| 2002/0171100 A1 | 11/2002 | Pohm | 257/310 |
| 2003/0091864 A1 * | 5/2003 | Hoshino et al. | 428/692 |

OTHER PUBLICATIONS

H. J. M. Swagten et al., *Enhanced Giant Magnetoresistance in Spin–Valves Sandwiched Between Insulating NiO*, Physical Review B, vol. 53, No. 14, pp. 9108–9114, Apr. 1, 1996.
W. F. Engelhoff, Jr. et al., *Oxygen As a Surfactant in the Growth of Giant Magnetoresistance Spin Valves*, J. Appl. Phys., vol. 82, No. 12, pp. 6142–6151, Dec. 15, 1997.

* cited by examiner

Primary Examiner—A. J. Heinz
(74) Attorney, Agent, or Firm—Wood, Herron & Evans, LLP

(57) ABSTRACT

A thermally stable spin valve sensor having an increased GMR ratio by virtue of an AP pinned layer structure in which the first and second pinned layers are separated by an AP coupling layer having a nano-oxide layer formed as an oxidized surface portion of the AP coupling layer. The nano-oxide layer provides an increase in the specular scattering, and in turn, an increase in the GMR ratio.

20 Claims, 7 Drawing Sheets

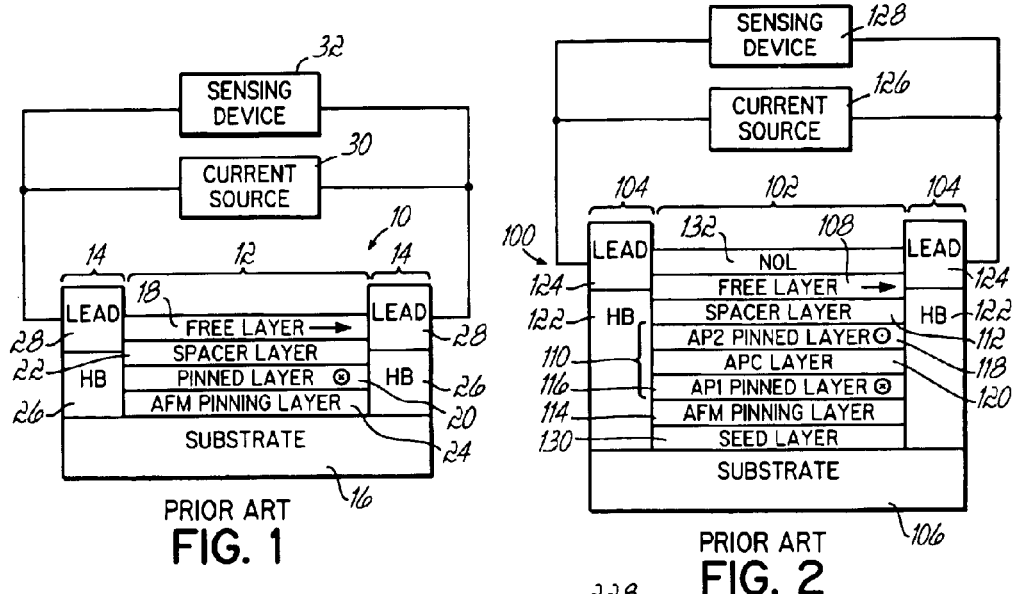
PRIOR ART
FIG. 1
PRIOR ART
FIG. 2
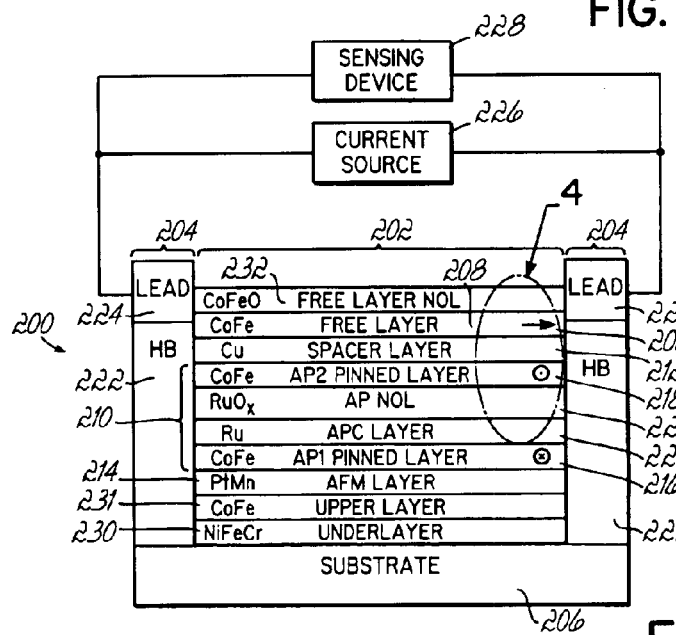
FIG. 3
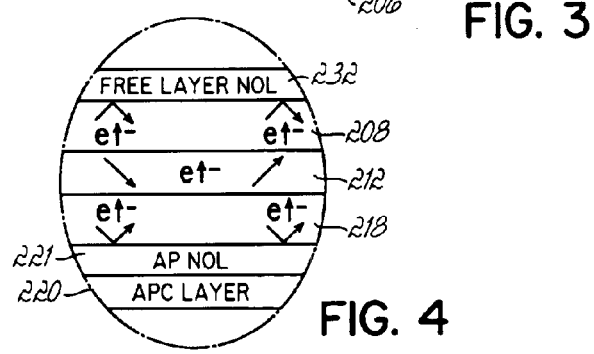
FIG. 4

SPIN VALVE WITH THERMALLY STABLE PINNED LAYER STRUCTURE HAVING RUTHENIUM OXIDE SPECULAR REFLECTING LAYER

FIELD OF THE INVENTION

The present invention relates to spin valve thin-film magnetic elements for reading signals recorded in a magnetic medium, and more particularly, to the inclusion of specular reflecting layers in a spin valve sensor for increasing the giant magnetoresistive ratio of the magnetic element. These spin valve sensors can also be used in any application in which detection of small magnetic fields is the method of operation.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Magnetic heads, including read sensors, are then used to read data from the disk surfaces.

In high capacity disk drives, magnetoresistive read sensors (MR sensors) are the prevailing read sensors. An MR sensor detects a magnetic field through the change in resistance of its MR sensing layer (MR element) as a function of the strength and direction of the magnetic flux being sensed by the MR layer.

One type of MR sensor is the giant magnetoresistance (GMR) sensor manifesting the GMR effect. In GMR sensors, the resistance of the MR element varies as a function of the spin-dependent transmission of the conduction electrons between magnetic layers separated by a nonmagnetic layer (spacer) and the accompanying spin-dependent scattering which takes place at the interface of the magnetic and nonmagnetic layers and within the magnetic layers.

GMR sensors using two layers of ferromagnetic material separated by a layer of nonmagnetic electrically conductive material are generally referred to as spin valve (SV) sensors manifesting the GMR effect. In a spin valve sensor, one of the ferromagnetic layers, referred to as the pinned layer, has its magnetization typically pinned by exchange coupling with an antiferromagnetic layer. The magnetization of the other ferromagnetic layer, referred to as the free layer, is not fixed and is free to rotate in response to the field from the recorded magnetic medium. In spin valve sensors, the spin valve effect varies as the cosine of the angle between the magnetization of the pinned layer and the magnetization of the free layer. Recorded data can be read from a magnetic medium because the external magnetic field from the recorded magnetic medium causes a change in the direction of the magnetization in the free layer, which in turn causes a change in resistance of the spin valve sensor and a corresponding change in the sensed current or voltage.

FIG. 1 shows a typical simple spin valve 10 (not drawn to scale) comprising a central region 12 separating end regions 14 formed on a substrate 16. In central region 12, a free layer (free ferromagnetic layer) 18 is separated from a pinned layer 20 (pinned ferromagnetic layer) by a nonmagnetic, electrically-conducting spacer layer 22. The magnetization of the pinned layer 20 is fixed through exchange coupling with an antiferromagnetic (AFM) layer 124. FIG. 1 is an air bearing surface (ABS) view, and the arrows indicate that the free layer 18 has a magnetization direction, in the absence of an external magnetic field, parallel to the ABS and the pinned layer 20 has a magnetization direction perpendicular or 90° to the ABS, wherein the ABS is an exposed surface of the sensor that faces the magnetic medium. Hard biased layers 26 are formed in the end regions 14 to provide longitudinal bias for the free layer 18. Leads 28 are formed over hard biased layers 26 and provide electrical connections for the flow of a sensing current from a current source 30 to the sensor 10. Sensor device 32 is connected to leads 28 and senses the change in the resistance due to the changes induced in the free layer 18 by the external magnetic field. The construction depicted in FIG. 1 is the simplest construction for a spin valve sensor, and is well known in the art.

Another type of spin valve sensor is an antiparallel (AP) pinned spin valve sensor. In this type of magnetic element, a laminated AP pinned layer structure is substituted for the single pinned layer in FIG. 1. The AP pinned layer structure includes a nonmagnetic AP coupling layer (APC layer) between first and second AP pinned layers (AP1 and AP2, respectively). The AP1 pinned layer is exchange coupled to the antiferromagnetic pinning layer, which pins the magnetic moment (magnetization direction) of the AP1 pinned layer in the same direction as the magnetic spins of the pinning layer. By exchange coupling between the AP1 and AP2 layers, the magnetic moment of the AP2 pinned layer is pinned antiparallel to the magnetic moment of the AP1 pinned layer. An advantage of the AP pinned layer structure is that demagnetization fields of the AP1 and AP2 pinned layers partially counterbalance one another so that a small demagnetization field is exerted on the free layer for improved biasing of the free layer.

FIG. 2 shows an exemplary AP pinned spin valve sensor 100 (not drawn to scale) of the prior art. Spin valve sensor 100 has a central region 102 separating end regions 104 formed on a substrate 106. AP pinned spin valve sensor 100 comprises a free layer 108 separated from a laminated AP pinned layer structure 110 by a spacer layer 112. The magnetization of the laminated AP pinned layer structure 110 is fixed by an AFM pinning layer 114. The laminated AP pinned layer structure 110 includes a first ferromagnetic layer (AP1 layer) 116 and a second ferromagnetic layer (AP2 layer) 118 separated from each other by an antiparallel coupling layer (APC layer) 120. As with sensor 10 in FIG. 1, hard bias layers 122 are formed in end regions 104 to provide longitudinal biasing for the free layer 108, and electrical leads 124 provide electrical current from a current source 126 to the spin valve sensor 100. Sensor device 128 is connected to leads 124 to sense the change in resistance due to changes induced in the free layer 108.

FIG. 2 also shows an underlayer or seed layer 130 formed on the substrate 106. A seed layer is any layer deposited to modify the crystallographic texture or grain size of the subsequent layers, and may not be needed depending on the substrate. A variety of oxide and/or metal materials have been employed to construct underlayer 130 for improving the properties of spin valve sensors. Often, the underlayer 130 may be formed of tantalum, zirconium, hafnium or yttrium. Ideally, underlayer 130 comprises NiFeCr to further improve the operational characteristics of the sensor.

Various parameters of a spin valve sensor may be used to evaluate the performance thereof. Examples of such parameters include the structure sheet resistance (R) and the GMR ratio (ΔR/R), also referred to as the GMR coefficient. The GMR ratio is defined as $(R_{AP}-R_P)/R_P$, where $R_{AP}$ is the antiparallel resistance and $R_P$ is the parallel resistance. The GMR ratio is an expression of the magnitude of the sensor response, and thus, the operation of a spin valve sensor is maximized by maximizing the GMR ratio. The GMR effect depends on the angle between the magnetizations of the free and pinned layers. In a spin valve sensor, the electron scattering, and therefore the resistance, is maximum when the magnetizations of the pinned and free layers are antiparallel, i.e., a majority of the electrons are scattered as they try to cross the boundary between the MR layers. On the other hand, electron scattering and therefore the resistance is minimum when the magnetizations of the pinned and free layers are parallel, i.e., a majority of electrons are not scattered as they try to cross the boundary between the MR layers. Thus, there is net change in resistance of a spin valve sensor between parallel and antiparallel magnetization orientations of the pinned and free layers. The GMR effect, i.e., the net change in resistance, exhibited by a typical prior art spin valve sensor, such as that shown in FIG. 2, is about 6% to 8%.

The disk drive industry has been engaged in an ongoing effort to increase the overall sensitivity, or GMR ratio, of the spin valve sensors to permit the drive head to read smaller changes in magnetic flux. Higher GMR ratios enable the storage of more bits of information on any given disk surface, and ultimately provide for higher capacity disk drives without a corresponding increase in the size or complexity of the disk drives.

It is well known that the addition of specular reflecting layers increases the GMR ratio of spin valve films. The GMR ratio is highly dependent upon the specular scattering that occurs within the pinned layer and the free layer of the sensor, with higher specular scattering resulting in a higher GMR ratio. Specular reflectors may be formed of materials similar to the ferromagnetic material forming the pinned layer or the free layer. For example, oxides of cobalt, iron and nickel, or a mixture of these oxides, are suitable as specular reflecting materials. These specular reflectors may be formed by oxidizing the ferromagnetic film, or by sputtering onto the ferromagnetic film using an oxide target. The oxidized metal layers may also be referred to as nano-oxide layers (NOLs). Oxide layers are ideal reflectors due to their electronic properties. The specular layers can be added to the free layer structure (free layer NOL 132), as shown in FIG. 2, as well as to the pinned layer structure (AP NOL or bottom NOL)(not shown). The AP NOL is particularly challenging because it is located in the middle of the pinned layer in a spin valve stack and therefore may affect the pinning strength and the growth of the layers on top of it. Bottom NOL spin valves formed by oxidizing CoFe may have enhanced GMR properties, but typically have degraded pinning strength and poor thermal stability, which has prevented the use of bottom NOL spin valves in production processes.

There is therefore a need to develop a spin valve thin-film magnetic element in which the GMR ratio is increased by the use of an AP NOL layer without degradation in pinning strength and thermal stability.

SUMMARY OF THE INVENTION

The present invention provides a thermally stable spin valve thin-film magnetic element having an increased GMR ratio by virtue of an AP pinned layer structure in which the first and second pinned layers are separated by an AP coupling layer having a nano-oxide layer formed as an oxidized surface portion of the AP coupling layer. This AP pinned layer structure is adjacent to an AFM pinning layer which fixes the magnetization direction of the AP pinned layer structure. A ferromagnetic free layer structure is separated from the AP pinned layer structure by a nonmagnetic conductive spacer layer. The nano-oxide layer in the AP pinned layer structure, also referred to as an AP specular reflecting layer or AP NOL, provides an increase in the specular scattering, and in turn, an increase in the GMR ratio. The AP NOL layer also maintains good pinning for the structure and good thermal stability. In an exemplary embodiment, the ferromagnetic free layer structure also includes an NOL layer, such as that formed as an oxidized surface portion of the free layer ferromagnetic metal. Other exemplary embodiments may also include a seed layer or underlayer for improving or modifying the crystallographic texture and/or grain size of the subsequently deposited layers.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is an air bearing surface (ABS) view of a simple bottom spin valve of the prior art.

FIG. 2 is an ABS view of an AP pinned bottom spin valve of the prior art.

FIG. 3 is an ABS view of an AP pinned bottom spin valve of the present invention having a dual NOL structure.

FIG. 4 is an enlarged view of area 4 of FIG. 3 depicting the specular reflection that occurs between the free layer NOL and the AP NOL.

DETAILED DESCRIPTION

Figure 5:
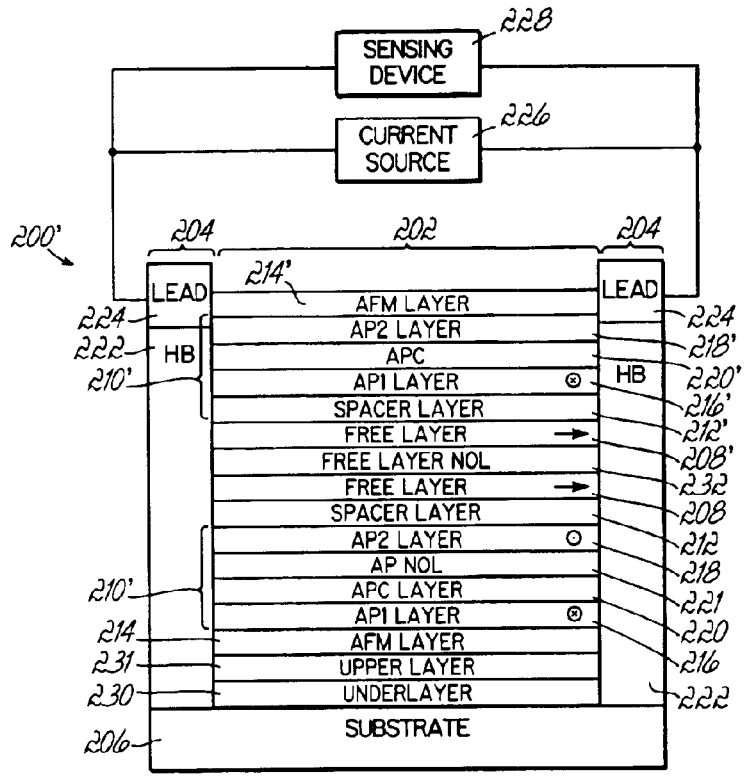
FIG. 5 is an AP pinned dual spin valve of the present invention having a dual NOL structure including a free layer NOL and a bottom AP NOL.

The present invention provides a thermally stable AP pinned spin valve magnetic element having a specular reflecting layer formed in the AP pinned structure as an oxidized surface portion of the AP coupling layer. For example, a nano-oxide layer (NOL) is formed on a ruthenium APC layer. Advantageously, the AP specular reflecting layer is formed by plasma oxidation, for example in an ion beam oxidation module, of the APC layer prior to deposition of a second pinned layer in an AP pinned layer structure.

For the successful inclusion of a specular reflecting layer in the AP pinned layer structure, particularly in a bottom spin valve, the magnetic element should exhibit the following: adequate reflectivity to achieve at least a 15% increase in the GMR ratio compared to a magnetic element having no specular reflecting layers; preservation of the crystalline texture (111) of the spin valve film stack to ensure good magnetic properties; maintenance of pinning properties of the pinned layer; and good thermal stability, i.e., minimal degradation of magnetic properties when subjected to elevated annealing temperatures and extended exposure times. An AP pinned spin valve sensor having a magnetic element in which a specular reflecting layer is formed as an oxidized surface portion of an AP coupling layer in an AP pinned layer structure provides the adequate reflectivity, pinning properties and thermal stability, and preserves the crystalline texture, and thus is superior to specular reflecting films of the prior art.

An exemplary embodiment of an AP pinned bottom spin valve of the present invention is depicted in FIG. 3. Spin valve sensor 200 has a central region 202 separating end regions 204 formed on a substrate 206. AP pinned spin valve sensor 200 comprises a seed or underlayer 230 formed on the substrate 206 to modify the crystallographic texture or grain size of the subsequent layers and thus improve the operation of the spin valve sensor. The primary function of the seed layer 230 is to form a foundation for the growth of the layers on top of it. Thus, it is preferred that the material (s) used to form the seed layer 230 has an FCC (face-centered-cubic) structure that forms with a (111) plane parallel to the substrate 206. Subsequent FCC layers formed over the seed layer 230 will then form with a substantially consistent crystalline structure and orientation. In an exemplary embodiment, underlayer 230 comprises NiFeCr. Other alloys of nickel-iron may also be used for the underlayer, as well as tantalum, zirconium, hafnium, or yttrium. The GMR ratio of sensor 200 is further enhanced by an upper layer 231. In an exemplary embodiment, the upper layer 231 is NiFe or CoFe or a combination thereof. In a further exemplary embodiment, the upper layer 231 has a thickness in the range of 4–20 Å.

An antiferromagnetic (AFM) pinning layer 214 is disposed on the upper layer 231. In an exemplary embodiment, the AFM pinning layer comprises one of an X—Mn alloy and a Pt—Mn—X' alloy, in which X is an element selected from the group consisting of Pt, Pd, Ir, Rh, Ru and Os, and X' is at least one element selected from the group consisting of Pd, Cr, Ru, Ni, Ir, Rh, Os, Au, Ag, Ne, Ar, Xe and Kr. Advantageously, the AFM pinning layer comprises PtMn. In a further exemplary embodiment, the AFM layer 214 has a thickness of about 80–300 Å.

The AP pinned spin valve sensor 200 further comprises a laminated AP pinned layer structure 210, which may also be referred to in the art as a synthetic pinned layer. The AFM pinning layer 214 fixes the magnetization direction of the AP pinned layer structure 210 to a direction perpendicular to the ABS. The laminated AP pinned layer structure 210 comprises a first pinned layer (AP1 layer) 216 disposed on the AFM pinning layer 214. An AP coupling layer (APC layer) 220 is disposed on the AP1 layer 216. In an exemplary embodiment, APC layer 220 comprises ruthenium. The APC layer 220 is oxidized, advantageously by plasma oxidation, to form an oxidized surface portion 221 disposed on the APC layer 220. This oxidized surface portion 221 is also referred to herein as an AP specular reflecting layer or an AP NOL. In the exemplary embodiment, the Ru APC layer 220 is oxidized to form a $RuO_x$ AP NOL 221. A second pinned layer (AP2 layer) 218 is then disposed on the oxidized surface portion 221. In an exemplary embodiment, AP1 and AP2 comprise CoFe or NiFe. In the embodiment shown in FIG. 3, the AFM pinning layer 214 fixes the magnetization direction of AP1 layer 216 in a direction perpendicular to and away from the ABS, and fixes AP2 layer 218 in a direction perpendicular to and towards the ABS, whereby AP1 layer 216 and AP2 layer 218 are antiparallel to each other. Though the thickness may vary, the total thickness of the AP pinned layer structure is advantageously 24–70 Å.

A spacer layer 212, which comprises a nonmagnetic conductive material, such as copper, is disposed on the AP pinned layer structure 210, specifically on AP2 layer 218. Spacer layer 212 separates the AP pinned layer structure 210 from a ferromagnetic free layer structure 208, which is disposed on the spacer layer 212. In an exemplary embodiment, spacer layer 212 comprises copper or the like, and has a thickness of 18–25 Å, and free layer 208 comprises CoFe or NiFe, and has a thickness of 10–55 Å. In a further exemplary embodiment, free layer 208 includes an oxidized surface portion 232, also referred to herein as the free layer NOL or the free layer specular reflecting layer.

As with sensors 10 and 100 of the prior art, hard bias layers 222 are formed in end regions 204 to provide longitudinal biasing for the free layer 208, and electrical leads 224 provide electrical current from a current source 226 to the spin valve sensor 200. Sensor device 228 is connected to leads 224 to sense the change in the resistance due to changes induced in the free layer 208.

FIG. 4 is an enlarged view of the magnetic element of FIG. 3 from the free layer NOL 232 to the APC layer 220, depicting the specular reflection of conduction electrons resulting from the dual NOL configuration of the present invention. Conduction electrons that might otherwise be lost by diffusive scattering are reflected back to the free layer 208 for spin-dependent scattering, thereby increasing the GMR ratio of the spin valve sensor 200. The free layer NOL 232 reflects electrons back down into the free layer 208, and AP NOL 221 reflects electrons upwardly to the AP2 layer 218 and through the spacer 212 to the free layer 208. In an alternative embodiment, the free layer NOL 232 may be eliminated, wherein an increase in the GMR ratio is still achieved due to specular reflection by the AP NOL, as compared to a magnetic element having no NOL layers.

Spin valve sensors are classified as simple pinned or antiparallel pinned, depending upon whether the pinned layer structure is one or more ferromagnetic layers with a unidirectional magnetic moment, such as the prior art structure depicted in FIG. 1, or a pair of ferromagnetic layers that are separated by a coupling layer with magnetic moments of the ferromagnetic layers being antiparallel, such as the prior art structure depicted in FIG. 2 and the structure of the present invention depicted in FIG. 3. Spin valve sensors are further classified as a top or bottom spin valve sensor depending upon whether the pinned layer is located near the bottom of the sensor or near the top of the sensor. FIGS. 1–3 are all bottom spin valves because the pinned layer is located near the bottom of the sensor. The prior art structure of FIG. 1 is a simple bottom spin valve, and the structures of FIG. 2 and FIG. 3 are AP pinned bottom spin valve sensors. The present invention is applicable to bottom spin valves wherein the AP NOL 221 is grown on the APC layer 220 so as to be disposed between the APC layer 220 and the free layer 208.

Spin valve sensors are still further classified as single or dual, wherein a single spin valve sensor employs only one pinned layer structure and a dual spin valve sensor employs two pinned layer structures with the free layer structure located therebetween. FIGS. 1–3 all depict single spin valve structures. The embodiment of the present invention depicted in FIG. 5 is an AP pinned dual spin valve 200' in which the structure is identical to that depicted in FIG. 3, but further comprising thereon a second free layer 208' upon which is disposed a second spacer layer 212'. A second or top AP pinned structure 210' is then disposed on the second spacer layer 212', and comprises a second AP1 layer 216' and a second AP2 layer 218' separated by a second APC layer 220'. The AP pinned structure 210' is topped by a second AFM layer 214'. No AP NOL is provided in the top AP pinned structure because the proper location would be under the APC layer. Thus, in this dual spin valve 200', specular reflection is increased in the bottom portion of the valve toward free layer 208 by the AP NOL 221 and the free layer NOL 232. In an alternative embodiment of a dual spin valve, the free layer NOL 232 and the second free layer 208' may be eliminated.

Thus, the addition of an AP specular reflecting layer in the form of an oxidized surface portion of an APC layer for enhancing the GMR ratio is equally applicable in any AP pinned spin valve, including bottom, top and dual spin valves.

EXAMPLES

Figure 6:
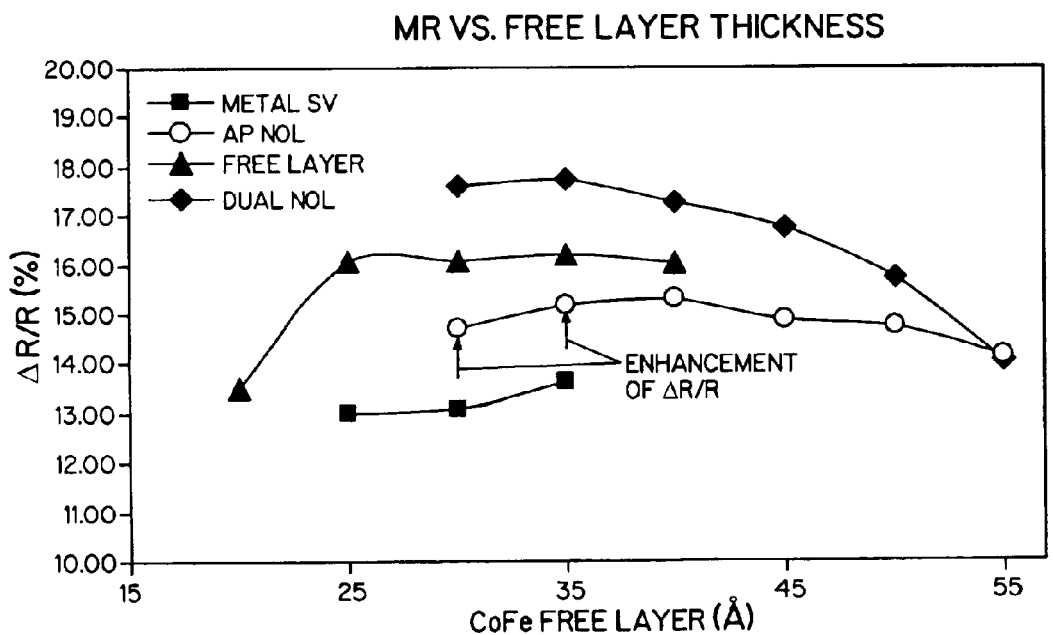
FIG. 6 is a plot of the GMR ratio as a function of the thickness of the free layer, for structures having no NOLs, an AP NOL only, a free layer NOL only, and dual NOLs.

An AP NOL layer of ruthenium oxide ($RuO_x$) is formed on a ruthenium APC layer of a synthetic pinned layer by plasma oxidation. An ion beam oxidation (IBO) module was used for this process and was operated in a plasma-only mode with Ar gas fed into the ion source. The $O_2$ gas was introduced into the IBO module at a different location. The process conditions for the plasma oxidation process included a power of 300 W, an argon flow of 10 sccm, an oxygen flow of 1 sccm and an exposure time of 10 seconds. The spin valve formed is a bottom AP pinned spin valve structure comprising, from the bottom up: NiFeCr45/CoFe10/PtMn120/CoFe16/Ru8.5/AP NOL/CoFe21/Cu20/CoFeX, wherein the numbers following each component indicate the thickness of that component in angstroms, with the thickness X of the CoFe free layer being varied between 20 Å and 55 Å. An AP pinned bottom spin valve structure was also formed having no AP NOL layer, and having a free layer NOL formed by oxidation of the CoFe free layer. An AP pinned bottom spin valve sensor was also formed having a dual NOL structure, as set forth for the structure having an AP NOL, with a free layer NOL added to the top of the structure by oxidation of the CoFe free layer. The magnetic properties obtained with these types of NOL structures are set forth in FIG. 6 for a series of spin valves with varying free layer thicknesses. Also shown in the plot, for comparison, is the result of a metal spin valve having no NOL layers. The data in FIG. 6 shows that with the addition of the AP NOL layer, the GMR ratio is enhanced. For a 30 Å CoFe free layer, the GMR ratio is increased from 13.1% to 14.7%, and for a 35 Å free layer, the GMR ratio is increased from 13.6% to 15.2%. Even further enhancement in the GMR ratio is obtained with a dual NOL structure. For a 30 Å CoFe free layer, the GMR ratio is increased from 13.1% to 17.61%, and for a 35 Å free layer, the GMR ratio is increased from 13.6% to 17.74%.

Figure 7A:
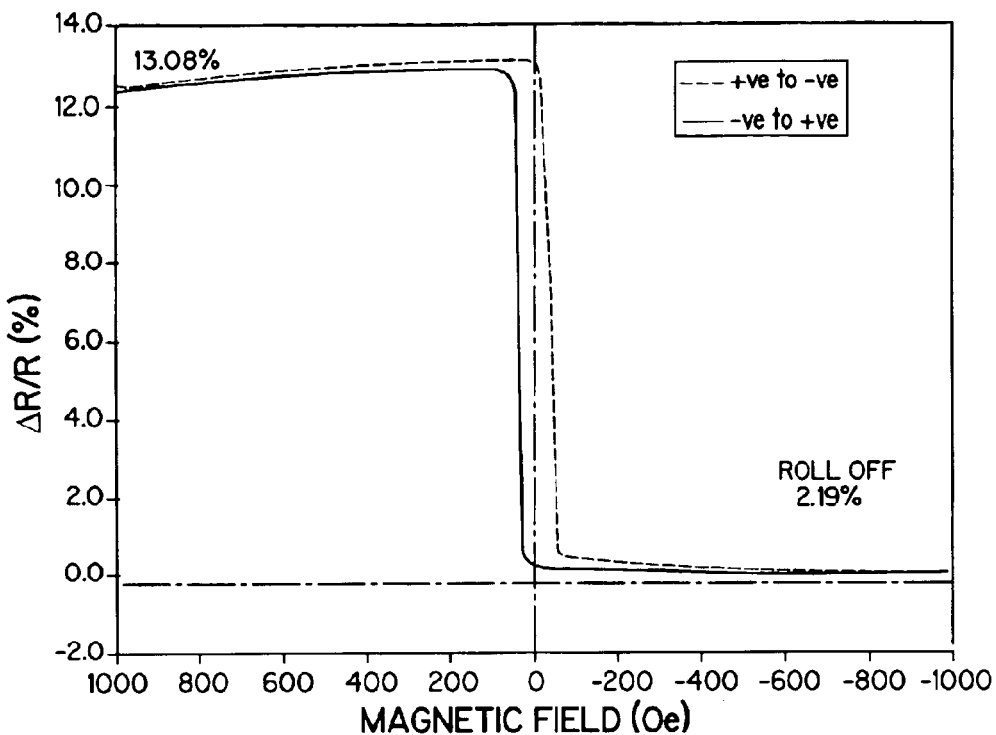
FIGS. 7A–7D are GMR-H traces showing little decrease in the pinning strength of spin valve magnetic elements having an AP NOL (FIGS. 7C and 7D) compared to spin valve magnetic elements having no NOLs (FIGS. 7A and 7B).
Figure 7B:
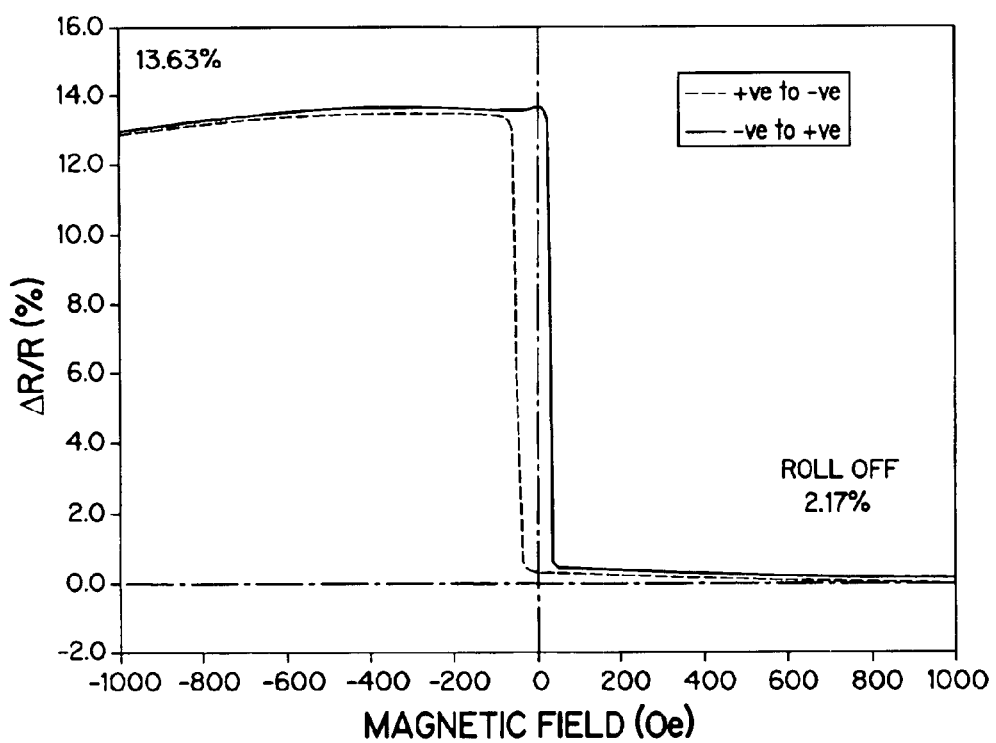
Figure 7C:
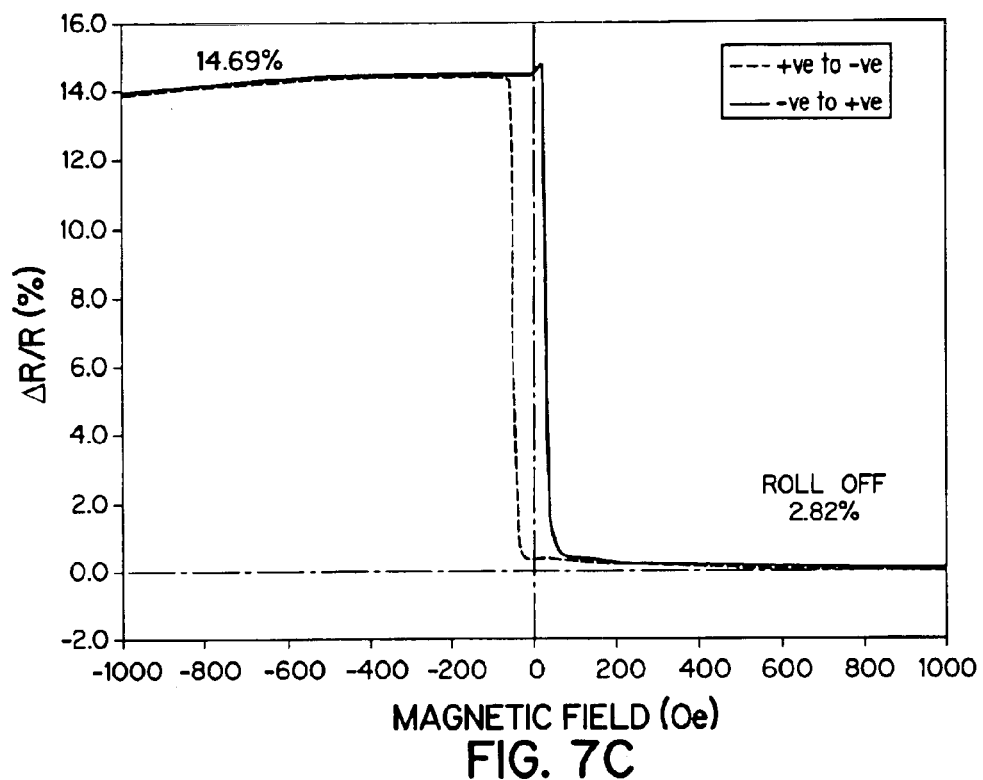
Figure 7D:
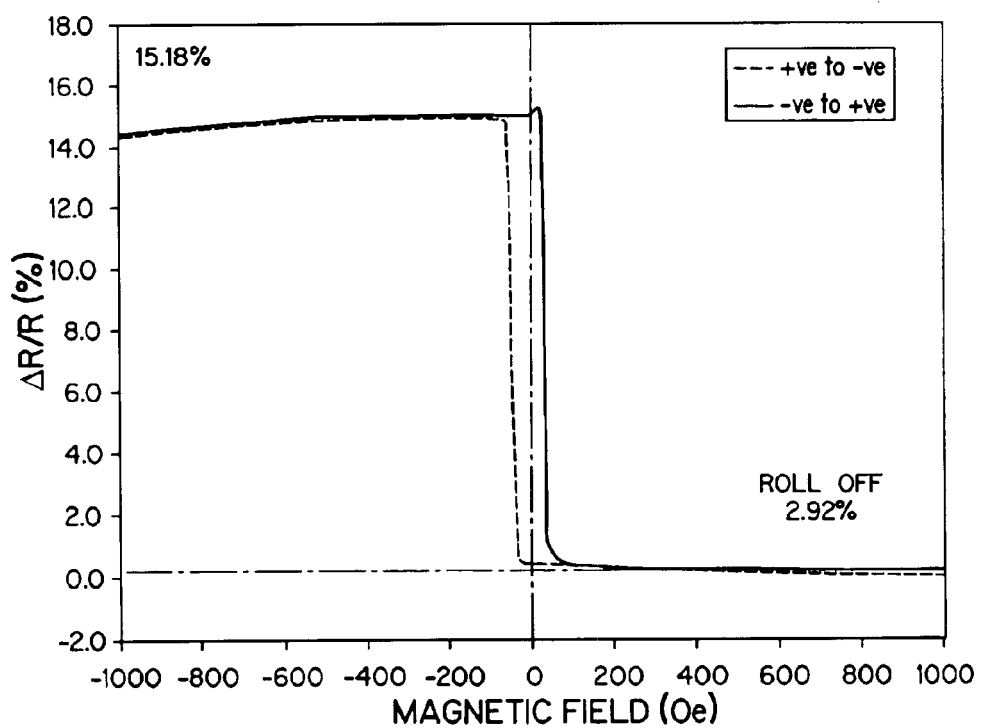

The pinning properties of the AP pinned structure remain intact despite the addition of an AP NOL layer, as shown in the high field GMR-H traces shown in FIGS. 7A–7D, wherein H refers to the external applied magnetic field in Oersteds. FIGS. 7A and 7B illustrate the MR response for the metal spin valve having no NOLs. The top portion of the curve from 0 magnetic field to ±1,000 Oe indicates the percent rolloff, or drop in the GMR ratio. Advantageously, the spin valve exhibits minimum rolloff. High rolloff indicates a degradation of the pinning properties. FIGS. 7C and 7D illustrate the pinning properties for the spin valve structure having an AP NOL layer. The AP NOL spin valve structure achieves a higher GMR ratio, with little increase in rolloff, as indicated by the circled portions of the graphs.

Figure 8A:
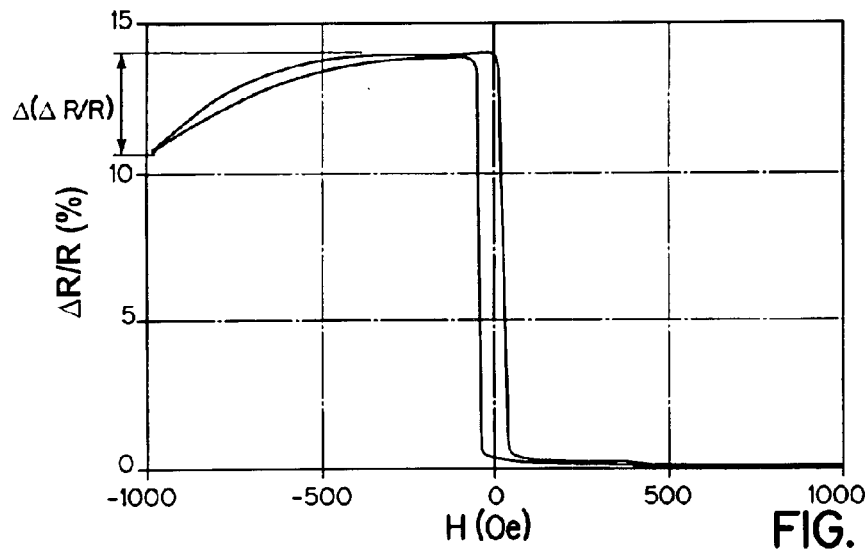
FIGS. 8A–B are GMR-H traces for spin valve magnetic elements having an AP NOL formed from a 5 Å CoFe AP layer and a Ru APC layer, respectively.
Figure 8B:
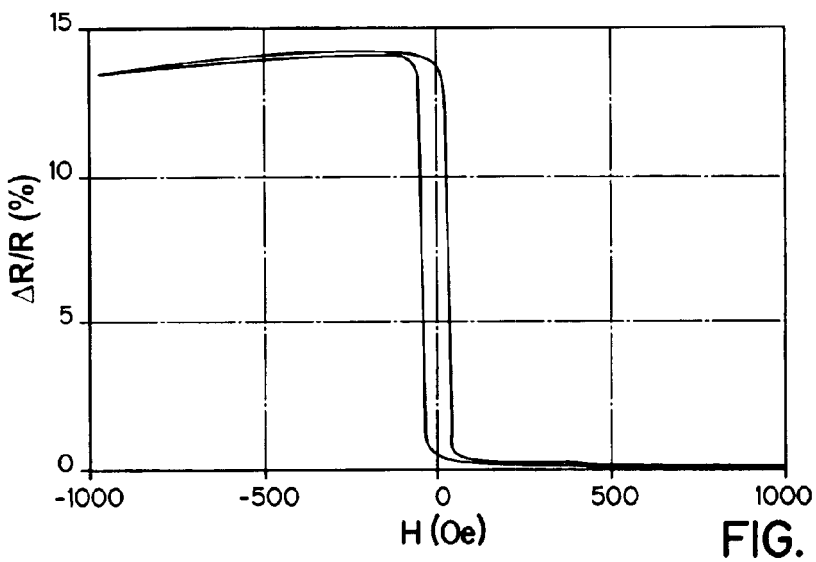
Figure 8C:
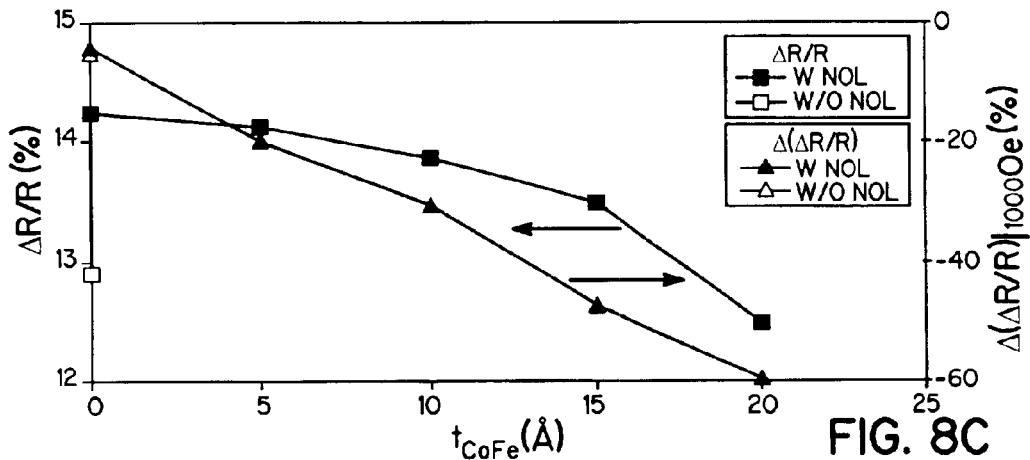
FIG. 8C is a plot of the CoFe AP layer thickness dependence of the GMR ratio and its rolloff at 1,000 Oe for films having a NOL formed by oxidation at the AP2 layer comprising CoFe, compared with a film having no NOL.

The advantage of the $RuO_x$ AP NOL of the present invention over the $CoFeO_x$ AP NOL of the prior art is demonstrated in FIGS. 8A–8C. FIG. 8A is a GMR-H trace for an AP pinned bottom spin valve having an AP NOL formed from a 5 Å CoFe AP layer and FIG. 8B is a GMR-H trace for a similar structure, but having an AP NOL formed from a Ru APC layer. The GMR response of the film having the $CoFeO_x$ layer formed by oxidizing the 5 Å CoFe AP layer degrades rapidly with increasing magnetic field, having a rolloff value of 19.9% at 1,000 Oe. Thus, the structure in FIG. 8A exhibits poor pinning strength, and thus is not suitable in commercial production. In contrast, the structure of FIG. 8B having the $RuO_x$ AP NOL formed by oxidizing a surface portion of the Ru APC layer exhibits only a 4.5% decrease in the GMR ratio. Thus, only the $RuO_x$ NOL preserves the pinning strength, while giving rise to an enhancement in the GMR ratio. FIG. 8C provides the CoFe AP layer thickness dependence of the GMR ratio and its rolloff at 1,000 Oe for films having the following structure, from the bottom up: NiFeCr35/NiFe10/PtMn150/CoFe18/Ru8.5/CoFe($t_{CoFe}$)-oxidation/CoFe20/Cu22/CoFe20/Cu8/Ta10, wherein the numerals refer to thickness in angstroms and $t_{CoFe}$ refers to the thickness of the AP layer subjected to oxidation to form the NOL. The GMR ratio is also expressed for a film having no NOL. FIG. 8C clearly demonstrates the degradation of the pinning properties in a structure having a $CoFeO_x$ AP NOL layer.

Figure 9A:
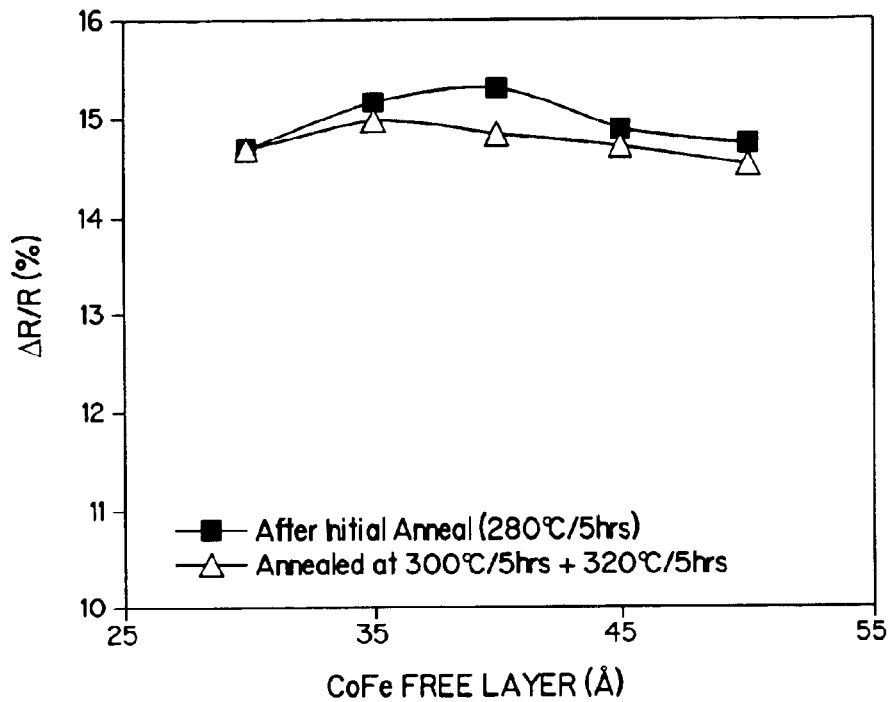
FIGS. 9A and 9B depict the results of thermal stability tests of a bottom spin valve having a $RuO_x$ AP NOL, with FIG. 9A plotting the GMR ratio as a function of free layer thickness and FIG. 9B plotting the GMR ratio and the $H_{int}$ as a function of annealing.
Figure 9B:
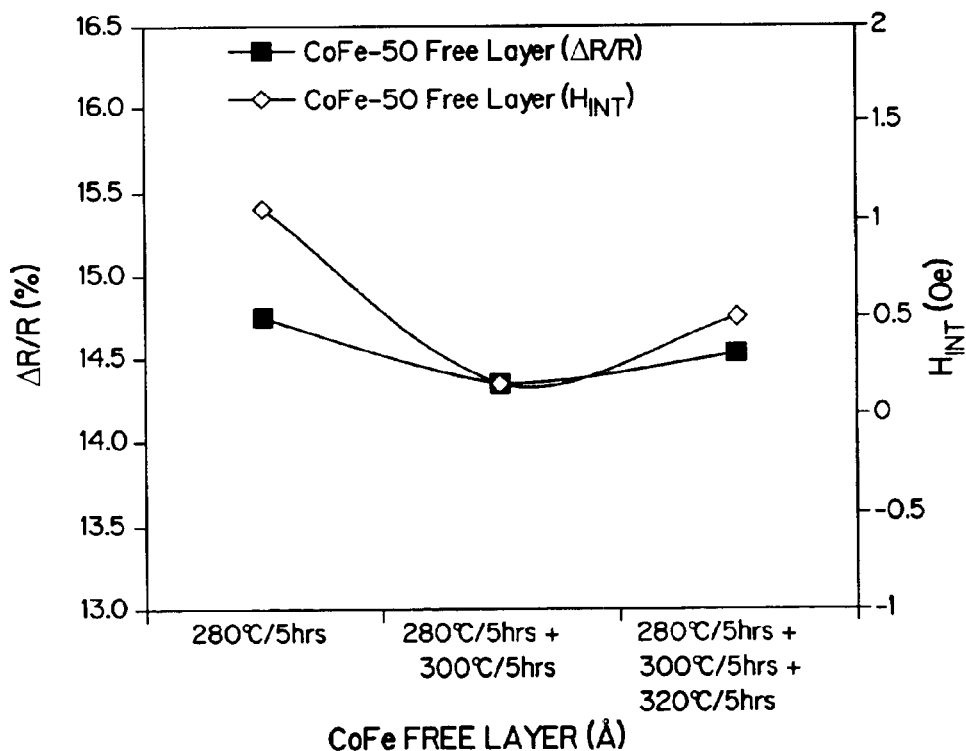
Figure 10A:
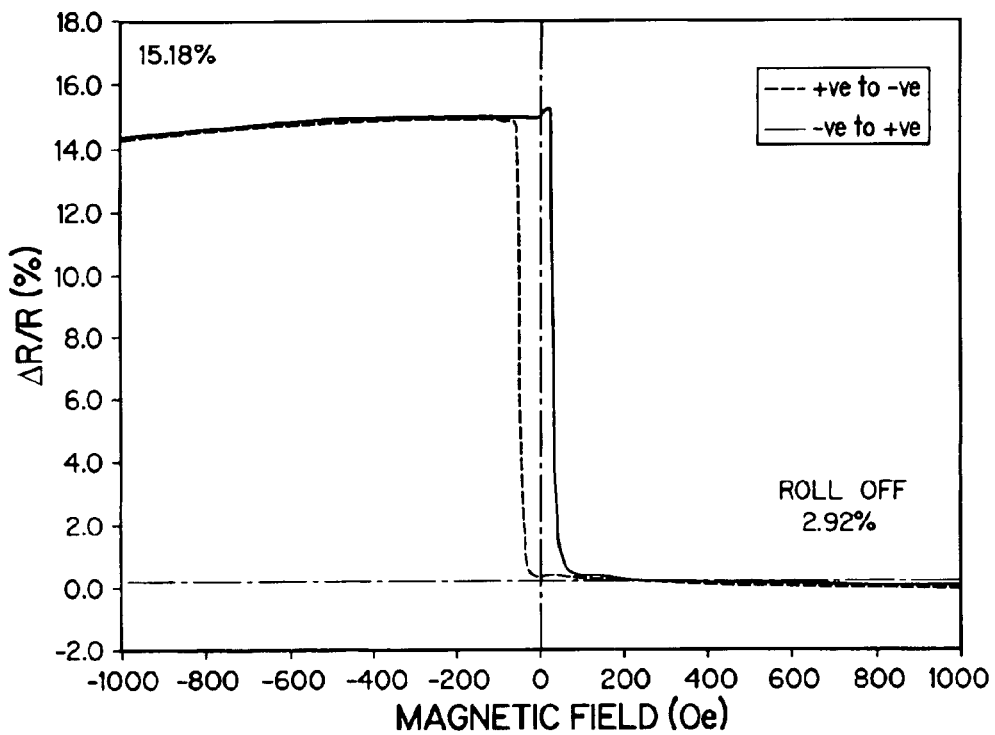
FIGS. 10A and 10B are high field GMR-H traces of a spin valve magnetic element having an AP NOL after a single anneal and an extended anneal, respectively.
Figure 10B:
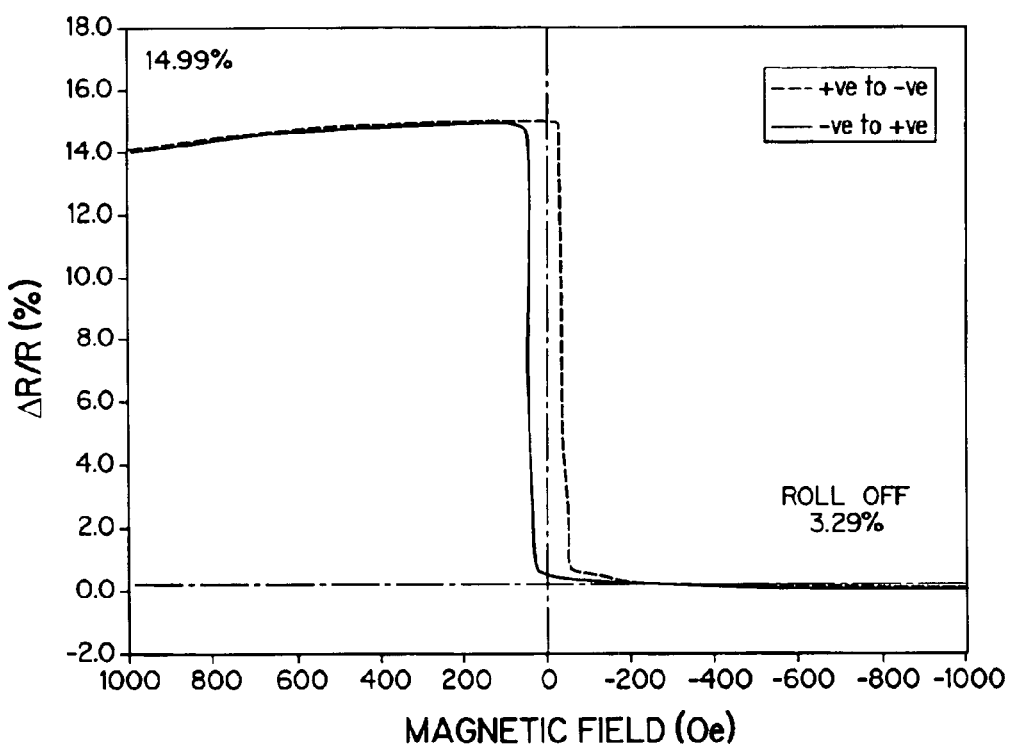

In addition to the importance of maintaining good pinning strength, exchange biased spin valves must also maintain good thermal stability. Results of thermal stability tests of AP pinned bottom spin valves having a $RuO_x$ AP NOL are depicted in FIGS. 9A and 9B. In FIG. 9A, the GMR ratio is plotted as a function of the thickness in angstroms of the CoFe free layer for a spin valve structure after an initial anneal at 280° C. for 5 hours, and for a spin valve structure further annealed at 300° C. for 5 hours followed by annealing at 320° C. for 5 hours. FIG. 9B plots the GMR ratio as a function of annealing for a structure having a 50 Å CoFe free layer. The GMR ratio and the magnetic field $H_{int}$ are provided after annealing at 280° C. for 5 hours, then again after further annealing at 300° C. for 5 hours, and then again after further annealing at 320° C. for 5 hours. Both plots show that the magnetic properties of the spin valves do not change dramatically, even after being subjected to high temperature and extended anneals. In particular, the GMR ratio drops by only about 1.5%. The corresponding high field GMR-H traces for an AP pinned bottom spin valve having a $RuO_x$ AP NOL and a 35 Å CoFe free layer are shown in FIGS. 10A and 10B. FIG. 10A provides the trace after a single 280° C. anneal for 5 hours and FIG. 10B provides the trace after an extended anneal at 280° C. for 5 hours, plus at 300° C. for 5 hours, plus at 320° C. for 5 hours. The plots show that the spin valve maintains it magnetic properties despite the high temperature extended anneal.

While not intending to be bound by theory, it is hypothesized that a $RuO_x$ AP NOL layer formed by a plasma oxidation method, such as ion beam oxidation, will maintain particularly good pinning as a result of being a "bridge" type layer rather than a continuous oxide layer. The plasma oxidation process for forming the nonmagnetic coupling layer is believed to produce regions where there is no oxide, whereby the layer maintains good pinning properties, but also enough oxide regions for specularity. It is further hypothesized that the thermal stability of the structure benefits from this bridge type structure or discontinuous oxide layer.

Thus, by virtue of the present invention, there is provided an AP pinned spin valve sensor having a new specular reflecting layer formed in the AP pinned structure as an oxidized surface portion of the AP coupling layer. This specular reflective layer may be formed by an appropriate oxidation method, such as ion beam oxidation, ion assisted oxidation, cluster ion beam oxidation, radical oxidation or natural oxidation. Where the APC layer is noble, such as for ruthenium, more aggressive oxidation methods, such as ion beam oxidation, may be preferred. A cluster ion beam oxidation process that maybe used in forming the AP NOL layer of the present invention is described in further detail in U.S. Pat. No. 6,800,565 entitled "METHOD OF FORMING THIN OXIDATION LAYER BY CLUSTER ION BEAM," filed on even date herewith and incorporated by reference herein in its entirety. The specular reflecting layer of the present invention is advantageously a discontinuous oxide layer. The formation of this specular layer enhances the GMR ratio and does not degrade the pinning properties of the spin valve. Moreover, spin valves having the specular layer formed from the APC layer are thermally stable, such that they maintain the enhanced GEAR ratio even after high temperature extended anneals.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, the underlayer 230 and upper layer 231 may be eliminated, if desired. Moreover, the various layers in the sensor stack may be single layers, as shown, or may be multiple layer structures, as is known in the art. Further, the composition and thickness of the layers may be varied, as desired, to optimize the performance of the spin valve. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A spin valve thin-film magnetic element comprising:
   an antiferromagnetic (AFM) pinning layer;
   an antiparallel (AP) pinned layer structure adjacent to the AFM pinning layer, the AFM pinning layer fixing a magnetization direction of the AP pinned layer structure;
   a ferromagnetic free layer structure; and
   a nonmagnetic conductive spacer layer disposed between the ferromagnetic free layer structure and the AP pinned layer structure,
   wherein the AP pinned layer structure comprises a first pinned layer and a second pinned layer separated by a non-magnetic AP coupling layer having an AP specular reflecting layer thereon that is an oxidized surface portion of the AP coupling layer.

2. The spin valve thin-film magnetic element of claim 1 wherein the oxidized surface portion is formed by plasma oxidation of the AP coupling layer.

3. The spin valve thin-film magnetic element of claim 1 wherein the first and second pinned layers comprise CoFe.

4. The spin valve thin-film magnetic element of claim 1 wherein the AFM pinning layer comprises PtMn.

5. The spin valve thin-film magnetic element of claim 1 wherein the ferromagnetic free layer structure comprises a ferromagnetic free layer having a specular reflecting layer thereon that is an oxidized surface portion of the ferromagnetic free layer.

6. The spin valve thin-film magnetic element of claim 5 wherein the ferromagnetic free layer structure comprises a CoFe free layer with a $CoFeO_x$ specular reflecting layer thereon.

7. The spin valve thin-film magnetic element of claim 1 further comprising an underlayer and upper layer disposed adjacent the AFM pinning layer on a side opposite the AP pinned layer structure.

8. The spin valve thin-film magnetic element of claim 7 wherein the underlayer comprises NiFeCr and the upper layer comprises CoFe or NiFe.

9. The spin valve thin-film magnetic element of claim 1 wherein the AFM layer comprises one of an X—Mn alloy and a Pt—Mn—X' alloy, in which X is an element selected from the group consisting of Pt, Pd, Ir, Rh, Ru and Os, and X' is at least one element selected from the group consisting of Pd, Cr, Ru, Ni, Ir, Rh, Os, Au, Ag, Ne, Ar, Xe and Kr.

10. The spin valve thin-film magnetic element of claim 1 wherein the ferromagnetic free layer structure and the first and second pinned layers each comprise at least one layer of CoFe or NiFe.

11. A spin valve sensor comprising the spin valve thin-film magnetic element of claim 1 disposed on a substrate wherein the AFM pinning layer is disposed closest to the substrate and the ferromagnetic free layer structure is disposed furthest from the substrate to provide an AP pinned bottom spin valve.

12. A spin valve sensor comprising:
   a substrate;
   a NiFeCr underlayer disposed on the substrate;
   an upper layer disposed on the underlayer and comprising NiFe or CoFe;
   an antiferromagnetic (AFM) pinning layer disposed on the upper layer and comprising one of an X—Mn alloy and a Pt—Mn—X' alloy, in which X is an element selected from the group consisting of Pt, Pd, Ir, Rh, Ru and Os, and X' is at least one element selected from the group consisting of Pd, Cr, Ru, Ni, Ir, Rh, Os, Au, Ag, Ne, Ar, Xe and Kr;
   an antiparallel (AP) pinned layer structure adjacent the AFM pinning layer, the AFM pinning layer fixing a magnetization direction of the AP pinned layer structure, wherein the AP pinned layer structure comprises:
      a first pinned layer disposed on the AFM pinning layer and comprising CoFe or NiFe,
      a Ru AP coupling layer disposed on the first pinned layer
      a $RuO_x$ AP specular reflecting layer formed from a surface portion of the Ru layer;
      a second pinned layer disposed on the $RuO_x$ layer and comprising CoFe or NiFe;
   a nonmagnetic conductive spacer layer disposed on the AP pinned layer structure; and a ferromagnetic free layer structure disposed on the spacer layer and comprising a free layer of CoFe or NiFe and a specular reflecting layer comprising an oxidized surface portion of the free layer.

13. The spin valve sensor of claim 12 wherein the $RuO_x$ AP specular reflecting layer is formed by plasma oxidation of the Ru AP coupling layer.

14. A spin valve thin-film magnetic element comprising:

an antiferromagnetic (AFM) pinning layer;

an antiparallel (AP) pinned layer structure adjacent to the AFM pinning layer, the AFM pinning layer fixing a magnetization direction of the AP pinned layer structure;

a ferromagnetic free layer structure; and a nonmagnetic conductive spacer layer disposed between the ferromagnetic free layer structure and the AP pinned layer structure, wherein the AP pinned layer structure comprises a first pinned layer and a second pinned layer separated by a ruthenium AP coupling layer having a ruthenium oxide AP specular reflecting layer thereon that is an oxidized surface portion of the ruthenium AP coupling layer.

15. The spin valve thin-film magnetic element of claim 14 wherein the ferromagnetic free layer structure comprises a ferromagnetic free layer having a specular reflecting layer thereon that is an oxidized surface portion of the ferromagnetic free layer.

16. The spin valve thin-film magnetic element of claim 15 wherein the ferromagnetic free layer structure comprises a CoFe free layer with a $CoFeO_x$ specular reflecting layer thereon.

17. The spin valve thin-film magnetic element of claim 14 wherein the AFM pinning layer comprises one of an X—Mn alloy or a Pt—Mn—X' alloy, in which X is an element selected from the group consisting of Pt, Pd, Ir, Rh, Ru and Os, and X' is at least one element selected from the group consisting of Pd, Cr, Ru, Ni, Ir, Rh, Os, Au, Ag, Ne, Ar, Xe and Kr.

18. The spin valor thin-film magnetic element of claim 14 wherein the ferromagnetic free layer structure and the first and second pinned layers each comprise at least one layer of CoFe or NiFe.

19. A spin valve sensor comprising the spin valve thin-film magnetic element of claim 14 disposed on a substrate wherein the AFM pinning layer is disposed closest to the substrate and the ferromagnetic free layer structure is disposed furthest from the substrate to provide an AP pinned bottom spin valve.

20. The spin valve thin-film magnetic element of claim 14 wherein the oxidized surface portion is formed by plasma oxidation of the AP coupling layer.

* * * * *

UNITED STATES PATENT AND TRADEMARK OFFICE
CERTIFICATE OF CORRECTION

PATENT NO. : 6,934,131 B2
DATED : August 23, 2005
INVENTOR(S) : Ming Mao et al.

It is certified that error appears in the above-identified patent and that said Letters Patent is hereby corrected as shown below:

Column 5,
Line 32, "material (s)" should read -- material(s) --.

Column 9,
Line 21, "maybe" should read -- may be --.
Line 32, "GEAR" should read -- GMR --.

Column 10,
Line 49, "clement" should read -- element --.
Line 58, "NiFe," should read -- NiFe; --.
Line 60, "layer" should read -- layer; --.

Column 12,
Line 12, "valor" should read -- valve --.

Signed and Sealed this

Twenty-seventh Day of December, 2005

JON W. DUDAS
*Director of the United States Patent and Trademark Office*